United States Patent
White

(10) Patent No.: US 10,404,060 B2
(45) Date of Patent: Sep. 3, 2019

(54) PHOTOVOLTAIC STRING REVERSE POLARITY DETECTION

(71) Applicant: ABB Schweiz AG, Baden (CH)

(72) Inventor: Paul M. White, Phoenix, AZ (US)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/552,088

(22) PCT Filed: Feb. 22, 2016

(86) PCT No.: PCT/US2016/018890
§ 371 (c)(1),
(2) Date: Aug. 18, 2017

(87) PCT Pub. No.: WO2016/134356
PCT Pub. Date: Aug. 25, 2016

(65) Prior Publication Data
US 2018/0048146 A1    Feb. 15, 2018

Related U.S. Application Data

(60) Provisional application No. 62/119,208, filed on Feb. 22, 2015.

(51) Int. Cl.
*H01H 85/05* (2006.01)
*H02H 11/00* (2006.01)
(Continued)

(52) U.S. Cl.
CPC .......... *H02H 11/002* (2013.01); *H01H 85/05* (2013.01); *H02S 50/00* (2013.01); *H02S 99/00* (2013.01)

(58) Field of Classification Search
CPC ....... H02H 11/002; H02S 50/00; H02S 99/00; H01H 85/05
See application file for complete search history.

(56) References Cited

U.S. PATENT DOCUMENTS 3,387,200 A   6/1968   Godshalk
3,763,398 A   10/1973  Ragaly
(Continued)

FOREIGN PATENT DOCUMENTS

CN   1061288 A    5/1992
CN   201196666 Y  2/2009
(Continued)

OTHER PUBLICATIONS

SMA Solar Technology, 2012, file:///H:/Case%20Working%20Document%20Archive/15-552088/SSM-U-DEN1834-V13web.pdf (Year: 2012).*

(Continued)

*Primary Examiner* — Hoa C Nguyen
*Assistant Examiner* — Keith DePew
(74) *Attorney, Agent, or Firm* — Barnes & Thornburg LLP

(57) ABSTRACT

One or more techniques and/or systems are provided for detecting reverse polarity of a photovoltaic system. A fuse holder may comprise a fuse holder body configured to receive a fuse used to protect against excessive current from a photovoltaic string of the photovoltaic system, such as current from a short circuit due to the photovoltaic string being installed backwards and having a reverse polarity. Because installation of the fuse while the photovoltaic string has reverse polarity may result in substantial damage and harm, a reverse polarity detection component may be configured to identify the reverse polarity and provide a warning of the reverse polarity before the fuse is installed (e.g., an audible alert, a blinking light, a locking of the fuse holder to prohibit installation of the fuse, etc.).

19 Claims, 12 Drawing Sheets

(51) Int. Cl.
*H02S 50/00* (2014.01)
*H02S 99/00* (2014.01)

(56) References Cited

U.S. PATENT DOCUMENTS

| | | | |
|---|---|---|---|
| 4,358,810 A | 11/1982 | Wafer et al. | |
| 5,229,220 A | 7/1993 | Stanton et al. | |
| 5,338,991 A | 8/1994 | Lu | |
| 6,075,441 A * | 6/2000 | Maloney | G07C 9/00896 235/375 |
| 6,331,670 B2 | 12/2001 | Takehara et al. | |
| 6,339,538 B1 | 1/2002 | Handleman | |
| 6,657,118 B2 | 12/2003 | Toyomura et al. | |
| 6,727,602 B2 | 4/2004 | Olson | |
| 6,741,435 B1 | 5/2004 | Cleveland | |
| 6,867,704 B2 | 3/2005 | Pellegrino | |
| 7,248,946 B2 | 7/2007 | Bashaw et al. | |
| 7,388,348 B2 | 6/2008 | Mattichak | |
| 7,432,618 B2 | 10/2008 | Taylor | |
| 7,566,828 B2 | 7/2009 | Sasaki | |
| 7,899,035 B2 | 3/2011 | Eklund et al. | |
| 7,924,582 B2 | 4/2011 | Müller et al. | |
| 8,023,266 B2 | 9/2011 | Russell et al. | |
| 8,080,899 B2 | 12/2011 | Paull | |
| 8,134,812 B2 | 3/2012 | Gilmore et al. | |
| 8,148,849 B2 | 4/2012 | Zanarini et al. | |
| 8,179,147 B2 | 5/2012 | Dargatz et al. | |
| 8,204,709 B2 | 6/2012 | Presher, Jr. et al. | |
| 8,289,183 B1 | 10/2012 | Foss | |
| 8,314,375 B2 | 11/2012 | Arditi et al. | |
| 8,338,989 B2 | 12/2012 | Thompson | |
| 8,362,739 B2 | 1/2013 | Perot et al. | |
| 8,410,950 B2 | 4/2013 | Takehara et al. | |
| 8,454,389 B2 | 6/2013 | Buettner | |
| 8,455,752 B2 | 6/2013 | Korman et al. | |
| 8,466,706 B2 | 6/2013 | Ramsey et al. | |
| 8,482,893 B2 | 7/2013 | West | |
| 8,531,055 B2 | 9/2013 | Adest et al. | |
| 8,547,669 B2 | 10/2013 | Larson et al. | |
| 8,558,102 B2 | 10/2013 | Croft et al. | |
| 8,581,441 B2 | 11/2013 | Rotzoll et al. | |
| 8,587,906 B2 | 11/2013 | Bhavaraju et al. | |
| 8,624,443 B2 | 1/2014 | Mumtaz | |
| 8,645,937 B2 | 2/2014 | Angerer et al. | |
| 8,659,880 B2 | 2/2014 | Russell et al. | |
| 8,659,922 B2 | 2/2014 | Rotzoll | |
| 8,674,545 B2 | 3/2014 | Signorelli et al. | |
| 8,684,758 B2 | 4/2014 | Gharabegian et al. | |
| 8,723,370 B2 | 5/2014 | West | |
| 8,725,437 B2 | 5/2014 | Caine | |
| 8,742,620 B1 | 6/2014 | Brennan et al. | |
| 8,749,934 B2 * | 6/2014 | Hackenberg | H02J 1/10 136/244 |
| 8,762,083 B2 * | 6/2014 | Rodseth | G01R 31/07 702/65 |
| 8,773,236 B2 | 7/2014 | Makhota et al. | |
| 8,779,632 B2 | 7/2014 | Freyermuth | |
| 8,816,535 B2 | 8/2014 | Adest et al. | |
| 8,829,715 B2 | 9/2014 | Agamy et al. | |
| 8,837,098 B2 | 9/2014 | Victor et al. | |
| 8,842,397 B2 | 9/2014 | Fahrenbruch et al. | |
| 8,847,614 B2 | 9/2014 | DeBone et al. | |
| 8,854,193 B2 | 10/2014 | Makhota et al. | |
| 8,859,884 B2 | 10/2014 | Dunton et al. | |
| 8,860,242 B1 | 10/2014 | Pruett et al. | |
| 2005/0121067 A1 | 6/2005 | Toyomura et al. | |
| 2006/0237058 A1 | 10/2006 | McClintock et al. | |
| 2008/0078436 A1 | 4/2008 | Nachamkin et al. | |
| 2008/0111517 A1 | 5/2008 | Pfeifer et al. | |
| 2008/0174926 A1 | 7/2008 | Evans et al. | |
| 2008/0236648 A1 | 10/2008 | Klein et al. | |
| 2008/0285317 A1 | 11/2008 | Rotzoll | |
| 2008/0304298 A1 * | 12/2008 | Toba | H02H 7/122 363/56.01 |
| 2009/0000654 A1 | 1/2009 | Rotzoll et al. | |
| 2009/0140715 A1 | 6/2009 | Adest et al. | |
| 2009/0141522 A1 | 6/2009 | Adest et al. | |
| 2009/0207543 A1 | 8/2009 | Boniface et al. | |
| 2010/0019913 A1 * | 1/2010 | Rodseth | H01H 85/32 340/638 |
| 2010/0127570 A1 | 5/2010 | Hadar et al. | |
| 2010/0139734 A1 | 6/2010 | Hadar et al. | |
| 2010/0139743 A1 | 6/2010 | Hadar et al. | |
| 2010/0275966 A1 | 11/2010 | Folts et al. | |
| 2010/0321837 A1 | 12/2010 | Caiti et al. | |
| 2011/0044083 A1 | 2/2011 | Thompson | |
| 2011/0049990 A1 | 3/2011 | Amaratunga et al. | |
| 2011/0088741 A1 | 4/2011 | Dunton et al. | |
| 2011/0088743 A1 | 4/2011 | Luo et al. | |
| 2011/0121652 A1 | 5/2011 | Sella et al. | |
| 2011/0138377 A1 | 6/2011 | Allen | |
| 2011/0149618 A1 | 6/2011 | Babcock et al. | |
| 2011/0157753 A1 | 6/2011 | Gilmore et al. | |
| 2011/0172842 A1 | 7/2011 | Makhota et al. | |
| 2011/0218687 A1 | 9/2011 | Hardar et al. | |
| 2011/0222327 A1 | 9/2011 | Thompson | |
| 2011/0245989 A1 | 10/2011 | Makhota et al. | |
| 2011/0255316 A1 | 10/2011 | Burger et al. | |
| 2011/0266876 A1 | 11/2011 | Lauinger et al. | |
| 2011/0276188 A1 | 11/2011 | Beck | |
| 2011/0292705 A1 | 12/2011 | Fornage | |
| 2011/0298292 A1 | 12/2011 | Bremicker et al. | |
| 2012/0026769 A1 | 2/2012 | Schroeder et al. | |
| 2012/0038227 A1 | 2/2012 | West | |
| 2012/0039101 A1 | 2/2012 | Falk et al. | |
| 2012/0048328 A1 | 3/2012 | Solon | |
| 2012/0049879 A1 | 3/2012 | Crites | |
| 2012/0053867 A1 | 3/2012 | Dunn et al. | |
| 2012/0081937 A1 | 4/2012 | Phadke | |
| 2012/0091804 A1 | 4/2012 | Aiello et al. | |
| 2012/0126626 A1 | 5/2012 | Falk et al. | |
| 2012/0139347 A1 * | 6/2012 | Hackenberg | H02J 1/10 307/71 |
| 2012/0140380 A1 | 6/2012 | Lin | |
| 2012/0140534 A1 | 6/2012 | Inukai et al. | |
| 2012/0151240 A1 | 6/2012 | Robinson et al. | |
| 2012/0175961 A1 | 7/2012 | Har-Shai et al. | |
| 2012/0205974 A1 | 8/2012 | McCaslin et al. | |
| 2012/0235498 A1 | 9/2012 | Johnson et al. | |
| 2012/0242320 A1 | 9/2012 | Fischer et al. | |
| 2012/0256584 A1 | 10/2012 | Crites | |
| 2012/0281444 A1 | 11/2012 | Dent | |
| 2012/0285502 A1 | 11/2012 | Philipp | |
| 2012/0310427 A1 | 12/2012 | Williams et al. | |
| 2012/0314747 A1 | 12/2012 | Boivin et al. | |
| 2012/0319489 A1 | 12/2012 | McCaslin et al. | |
| 2012/0325283 A1 | 12/2012 | Robbins | |
| 2013/0009483 A1 | 1/2013 | Kawate et al. | |
| 2013/0015875 A1 | 1/2013 | Kumar | |
| 2013/0026839 A1 | 1/2013 | Grana | |
| 2013/0033115 A1 | 2/2013 | Cutler et al. | |
| 2013/0050906 A1 | 2/2013 | Peplinski et al. | |
| 2013/0068284 A1 | 3/2013 | Beardsworth et al. | |
| 2013/0106196 A1 | 5/2013 | Johnson et al. | |
| 2013/0139384 A1 | 6/2013 | Abroy | |
| 2013/0148394 A1 | 6/2013 | O'Brien et al. | |
| 2013/0194706 A1 | 8/2013 | Har-Shai et al. | |
| 2013/0207678 A1 | 8/2013 | DeBone et al. | |
| 2013/0215983 A1 | 8/2013 | Fornage | |
| 2013/0250641 A1 | 9/2013 | Falk | |
| 2013/0263910 A1 | 10/2013 | Shinohara | |
| 2013/0307556 A1 | 11/2013 | Ledenev et al. | |
| 2014/0003108 A1 | 1/2014 | Song et al. | |
| 2014/0055900 A1 | 2/2014 | Luebke et al. | |
| 2014/0056044 A1 | 2/2014 | Yang et al. | |
| 2014/0060616 A1 | 3/2014 | Okandan et al. | |
| 2014/0062198 A1 | 3/2014 | Luo | |
| 2014/0070815 A1 | 3/2014 | Liu et al. | |
| 2014/0078791 A1 | 3/2014 | Gurudasani et al. | |
| 2014/0103855 A1 | 4/2014 | Wolter | |
| 2014/0142874 A1 | 5/2014 | Martin et al. | |
| 2014/0153303 A1 | 6/2014 | Potharaju | |
| 2014/0167513 A1 | 6/2014 | Chang et al. | |
| 2014/0183950 A1 | 7/2014 | Kohler | |

(56) References Cited

U.S. PATENT DOCUMENTS

| | | | |
|---|---|---|---|
| 2014/0185344 A1 | 7/2014 | Fornage et al. | |
| 2014/0210275 A1 | 7/2014 | Gong et al. | |
| 2014/0233286 A1 | 8/2014 | Adest et al. | |
| 2014/0265603 A1* | 9/2014 | Augustoni | H02S 50/00 307/80 |
| 2014/0285024 A1 | 9/2014 | Cheng et al. | |
| 2014/0291721 A1 | 10/2014 | Robbins | |
| 2014/0292085 A1 | 10/2014 | Yoscovich et al. | |
| 2014/0313640 A1 | 10/2014 | Peplinski et al. | |
| 2014/0355322 A1 | 12/2014 | Perreault et al. | |
| 2014/0360561 A1 | 12/2014 | Meyer et al. | |
| 2014/0373894 A1 | 12/2014 | Stratakos et al. | |
| 2014/0375145 A1 | 12/2014 | Volz | |
| 2015/0270785 A1 | 9/2015 | Idt et al. | |
| 2015/0280423 A1* | 10/2015 | Bremicker | H02M 1/32 307/71 |
| 2016/0197575 A1 | 7/2016 | Armstrong et al. | |

FOREIGN PATENT DOCUMENTS

| | | |
|---|---|---|
| CN | 201820311 U | 5/2011 |
| CN | 102109578 A | 6/2011 |
| CN | 102157966 A | 8/2011 |
| CN | 102193049 A | 9/2011 |
| CN | 202004452 U | 10/2011 |
| CN | 202119876 U | 1/2012 |
| CN | 202309503 U | 7/2012 |
| CN | 202474830 U | 10/2012 |
| CN | 202524069 U | 11/2012 |
| CN | 202535258 U | 11/2012 |
| CN | 202586793 U | 12/2012 |
| CN | 102867871 A | 1/2013 |
| CN | 202798128 U | 3/2013 |
| CN | 202839677 U | 3/2013 |
| CN | 202870216 U | 4/2013 |
| CN | 202872351 U | 4/2013 |
| CN | 103166240 A | 6/2013 |
| CN | 202997559 U | 6/2013 |
| CN | 103197613 A | 7/2013 |
| CN | 103208793 A | 7/2013 |
| CN | 203119597 U | 8/2013 |
| CN | 203119796 U | 8/2013 |
| CN | 203289188 U | 11/2013 |
| CN | 203350386 U | 12/2013 |
| CN | 203377671 U | 1/2014 |
| CN | 203378087 U | 1/2014 |
| CN | 103606956 A | 2/2014 |
| CN | 103747567 A | 4/2014 |
| CN | 203617965 U | 5/2014 |
| CN | 203618465 U | 6/2014 |
| DE | 10027879 A1 | 12/2001 |
| DE | 202007001648 U1 | 9/2007 |
| DE | 102010017746 A1 | 11/2011 |
| DE | 102010049293 B3 | 2/2012 |
| DE | 102011018972 A | 10/2012 |
| DE | 102012019556 A1 | 2/2014 |
| DE | 102011053524 B4 | 5/2015 |
| EP | 2048679 B1 | 4/2010 |
| EP | 2355367 A1 | 8/2011 |
| EP | 2442419 A2 | 4/2012 |
| EP | 2503669 A2 | 9/2012 |
| EP | 2621045 A2 | 7/2013 |
| JP | 2012000100301 | 11/2013 |
| WO | 2005031959 A1 | 4/2005 |
| WO | 2008138619 A1 | 11/2008 |
| WO | 2009045173 A2 | 4/2009 |
| WO | 2009051870 A1 | 4/2009 |
| WO | 2010042533 A2 | 4/2010 |
| WO | 2011077134 A2 | 6/2011 |
| WO | 2012035384 A1 | 3/2012 |
| WO | 2012079729 A2 | 6/2012 |
| WO | 2012176222 A1 | 12/2012 |
| WO | 2014011593 A1 | 1/2014 |
| WO | 2014090815 | 6/2014 |

OTHER PUBLICATIONS

Rapid System Shutdown (2014 NEC 690.12) Midnite Solar Inc. Renewable Energy System Electrical Components and E-Panels; http://www.midnitesolar.com/rapidshutdown/rapidshutdown.php; Accessed Nov. 2014.

Understanding the NEC 2014 and Its Impact on PV Systems: p. 1 of 23; Rebekah Hern et al., http://solarprofessional.com/articles/design-installation/understanding-the-nec-2014-and-its-impact-on-pv-systems?v=disable_pagination&nopaging=1#.WgnW5BvruHs; Apr. 2014; Accessed Nov. 2014.

Corresponding International Application, PCT/US2016/018890, International Search report dated Apr. 25, 2016.

* cited by examiner

PHOTOVOLTAIC STRING REVERSE POLARITY DETECTION

RELATED APPLICATIONS

This application claims priority to U.S. Provisional Application 62/119,208, titled "PHOTOVOLTAIC STRING REVERSE POLARITY DETECTION" and filed on Feb. 22, 2015, which is incorporated herein by reference.

BACKGROUND

Many electric systems may utilize photovoltaic arrangements, such as photovoltaic systems comprising solar panels that absorb and convert sunlight into electricity for power generation. An inverter may be configured to convert DC power from a photovoltaic arrangement to AC power for an AC power grid that may supply power to destination such as a building. The photovoltaic arrangement may comprise a plurality of photovoltaic strings that may be combined in parallel by a photovoltaic string combiner. A photovoltaic string may comprise a plurality of photovoltaic panels that are connected in series, which may produce an output voltage that is a summation of voltages of the respective photovoltaic panels. If a photovoltaic string is installed incorrectly, such as backwards (e.g., a positive terminal may be inadvertently connected to a negative connection and a negative terminal may be inadvertently connected to a positive connection), the photovoltaic string can be shorted out. The shorted photovoltaic string can cause other photovoltaic strings of the photovoltaic arrangement to provide fault energy, such as current, though the shorted photovoltaic string. Because the shorted photovoltaic string is installed backwards, the voltage across the shorted photovoltaic string is increased (e.g., the voltage of the shorted photovoltaic string may be summed with a voltage of the other photovoltaic strings because the shorted photovoltaic string is now in series with the other photovoltaic strings, as opposed to being in parallel), and thus a fuse used to protect against the excessive current from the short may be unable to open and may fail. An arc may result from the fuse not opening, which may result in substantial damage or physical harm. The fuse may fail because the fuse may have been rated for an open circuit voltage of the photovoltaic arrangement which may be less than the increased voltage that occurred due to the backwards installation (e.g., the fuse may be rated for an open circuit voltage of 100 v, but the shorted photovoltaic string may have a voltage of 200 v due to being installed backwards). Unfortunately, using fuses with higher voltage ratings may substantially increase costs of the photovoltaic arrangement.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for detecting reverse polarity of a photovoltaic system and/or a direct current system are provided herein. A fuse holder may be configured for installation within a photovoltaic system (e.g., installation along a power line over which a photovoltaic string provides DC power; installation within a photovoltaic string combiner used to combine one or more photovoltaic strings; etc.). The fuse holder may comprise a fuse holder body configured to receive a fuse. The fuse may be configured to open in order to interrupt excessive current from the photovoltaic string, such as due to a short circuit.

The fuse holder may be associated with and/or comprise a reverse polarity detection component. The reverse polarity detection component may be configured to identify a polarity of the photovoltaic string. Responsive to the polarity being indicative of a reverse polarity, the reverse polarity detection component may provide a reverse polarity indication of the reverse polarity. In an example, the reverse polarity detection component may provide an audible alert such as through a speaker. In another example, the reverse polarity detection component may provide a visible alert such as through an indicator light. In another example, a locking mechanism, of the fuse holder, may be configured to lock the fuse holder body to prohibit installation of the fuse based upon the photovoltaic string having the reverse polarity.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1A:
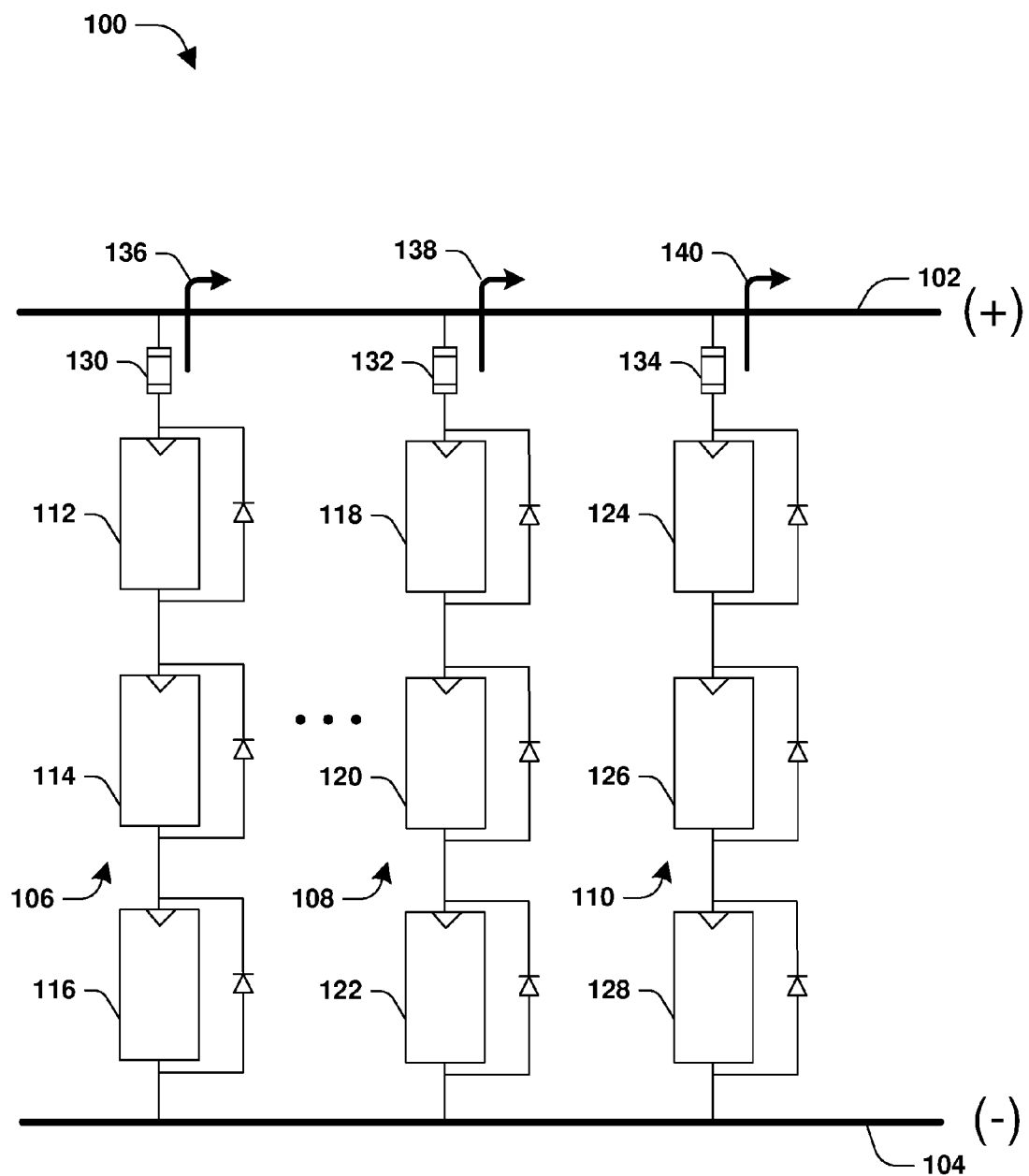
FIG. 1A is an example of a photovoltaic arrangement having a plurality of photovoltaic strings that are correctly installed.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

FIG. 1A illustrates an example of a photovoltaic arrangement 100 having a plurality of photovoltaic strings that are correctly installed (e.g., not installed backwards). The photovoltaic arrangement 100 may comprise a first photovoltaic string 106, a second photovoltaic string 108, a third photovoltaic string 110, and/or other photovoltaic strings, which may be connected in parallel such as by a photovoltaic string combiner. A photovoltaic string may comprise one or more photovoltaic panels connected in series. For example, the first photovoltaic string 106 may comprise a first photovoltaic panel 112, a second photovoltaic panel 114, and a third photovoltaic panel 116 connected between a negative power line connection 104 and a positive power line connection 102 (e.g., power line connections over which the photovoltaic arrangement 100 provides DC power, such as to an inverter). The second photovoltaic string 108 may comprise a fourth photovoltaic panel 118, a fifth photovoltaic panel 120, and a sixth photovoltaic panel 122 connected between the negative power line connection 104 and the positive power line connection 102. The third photovoltaic string 110 may comprise a seventh photovoltaic panel 124, an eighth photovoltaic panel 126, and a ninth photovoltaic panel 128 connected between the negative power line connection 104 and the positive power line connection 102.

Because a photovoltaic string comprise multiple photovoltaic panels in series, an output voltage of the photovoltaic string may be a summation of voltages of the photovoltaic panels. Because the photovoltaic strings are connected in parallel, the output voltage of the photovoltaic arrangement 100 may remain the same as a single photovoltaic string but an output current of the photovoltaic arrangement 100 may be increased by each photovoltaic string that is combined in parallel. The first photovoltaic string 106 may produce a first current 136. The second photovoltaic string 108 may produce a second current 138. The third photovoltaic string 110 may produce a third current 140.

A first fuse 130 may be installed for the first photovoltaic string 106. A second fuse 132 may be installed for the second photovoltaic string 108. A third fuse 134 may be installed for the third photovoltaic string 110. The fuses may be configured to open in order to interrupt excessive current from the photovoltaic arrangement 100, such as due to a short circuit.

Figure 1B:
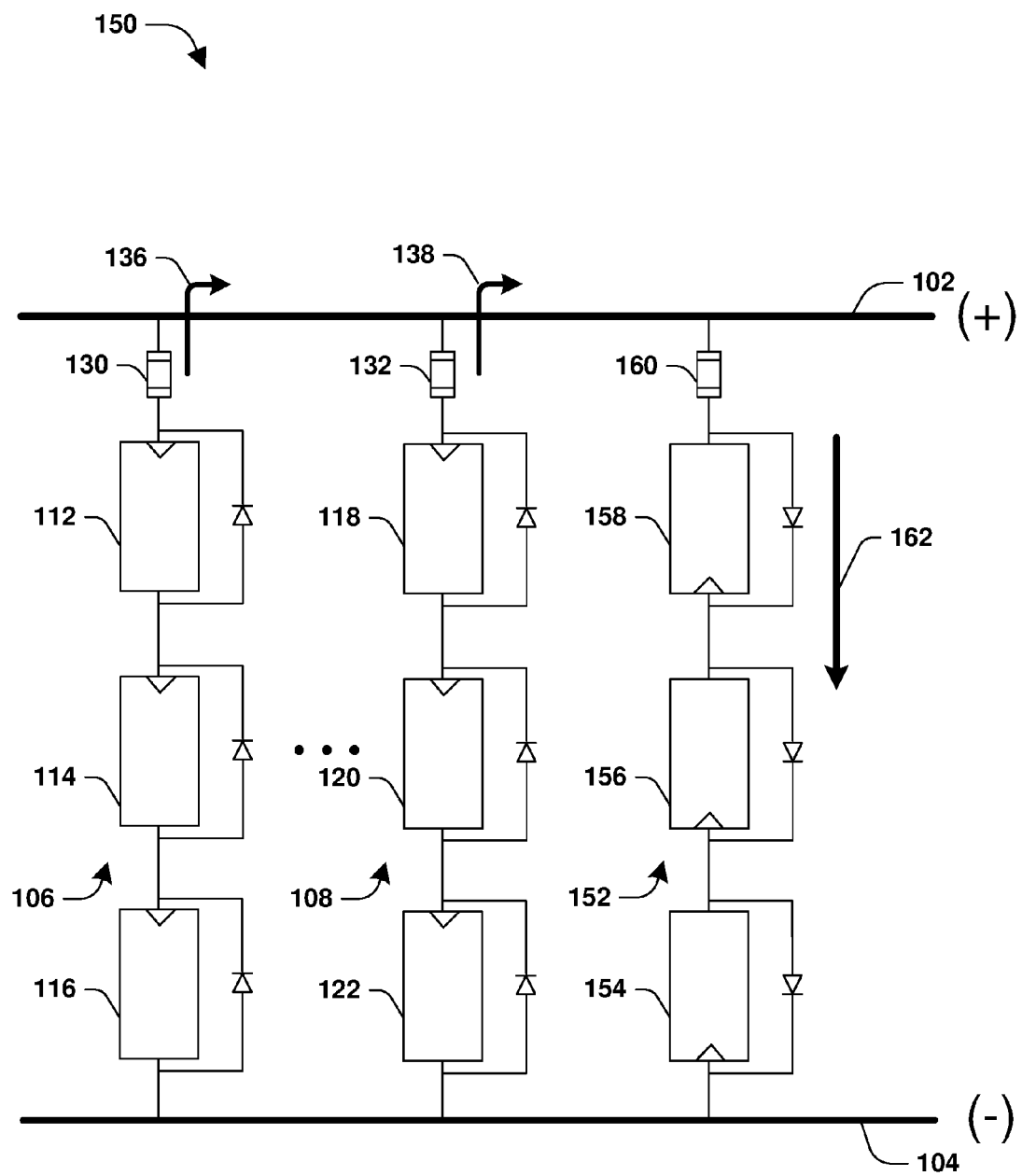
FIG. 1B is an example of a second photovoltaic arrangement having a plurality of photovoltaic strings, where at least one photovoltaic string is installed incorrectly.

FIG. 1B illustrates an example of a second photovoltaic arrangement 150 having a plurality of photovoltaic strings, where at least one photovoltaic string is installed incorrectly (e.g., installed backwards). For example, the second photovoltaic arrangement 150 may comprise the first photovoltaic string 106, the second photovoltaic string 108, and a fourth photovoltaic string 152. The fourth photovoltaic string 152 may comprise a tenth photovoltaic panel 154, an eleventh photovoltaic panel 156, and a twelfth photovoltaic panel 158. A fourth fuse 160 may be installed for the fourth photovoltaic string 152. The fourth fuse 160 may be configured to open in order to interrupt excessive current from the fourth photovoltaic string 152, such as due to a short circuit.

An installer of the second photovoltaic arrangement 150 may have installed the fourth photovoltaic string 152 incorrectly. For example, the fourth photovoltaic string 152 may have been installed backwards such that a positive terminal may have been connected to the negative power line connection 104 and a negative terminal may have been connected to the positive power line connection 102. Thus, the first current 136 from the first photovoltaic string 106 and the second current 138 from the photovoltaic string 108 may be combined with current of the third photovoltaic string 152, resulting in an increased current 162 through the third photovoltaic string 152. The increased current 162 may cause the fourth fuse 160 to attempt to open in order to interrupt the increased current 162 that may otherwise result in damage to the second photovoltaic arrangement 150. However, if the fourth fuse 160 was rated for an open circuit voltage of the fourth photovoltaic string 152, then the fourth fuse 160 may fail to open because the fourth photovoltaic string 152 may have an increased voltage greater than the open circuit voltage because the fourth photovoltaic string 152 is installed backward (e.g., the increased voltage may be twice the open circuit voltage because the fourth photovoltaic string 152 is connected in series instead of in parallel with the other photovoltaic strings because the fourth photovoltaic string 152 is installed backwards).

Accordingly, as provided herein, a reverse polarity detection component may be configured to detect reverse polarity within the second photovoltaic arrangement 150. For example, the reverse polarity detection component may be integrated into a fuse holder for the fourth fuse 160, and the reverse polarity detection component may provide a reverse polarity indication of reverse polarity before the fourth fuse 160 is installed into the fuse holder and the circuit is closed. In this way, an installer of the fourth fuse 160 may be provided with a warning of the reverse polarity before the fourth fuse 160 is installed and the circuit is closed. By providing advanced warning, the fourth fuse 160 may be rated according to the open circuit voltage of the fourth photovoltaic string 152 as opposed to twice the open circuit voltage (e.g., because the installer may be warned before installing the fourth fuse 160 and closing the circuit, which would otherwise result in an increased voltage being applied to the fourth fuse 160 due to the backwards installation of the fourth photovoltaic string 152), which may otherwise substantially increase the cost of fuses for the second photovoltaic arrangement 150. In an example, the fourth fuse 160 may be rated less than two times the open circuit voltage of the fourth photovoltaic string 152.

Figure 2A:
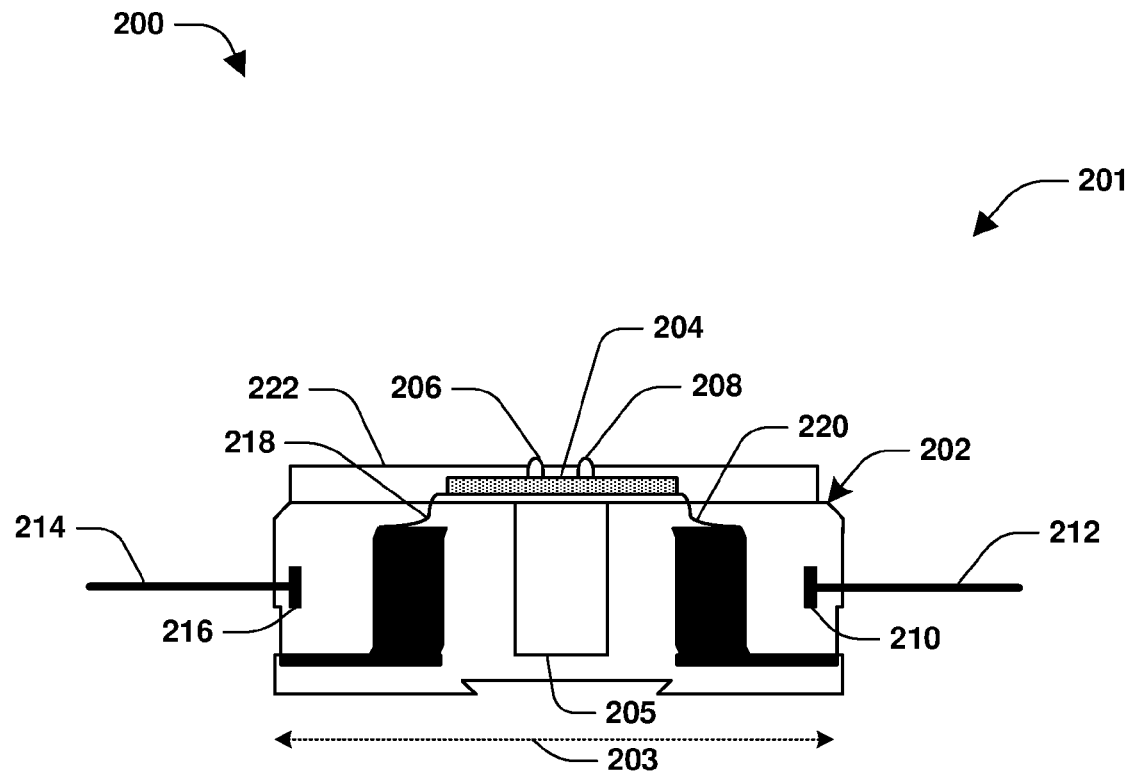
FIG. 2A is a component block diagram illustrating an exemplary system for detecting reverse polarity of a photovoltaic system, where a fuse holder comprises one or more indicator lights.
Figure 2B:
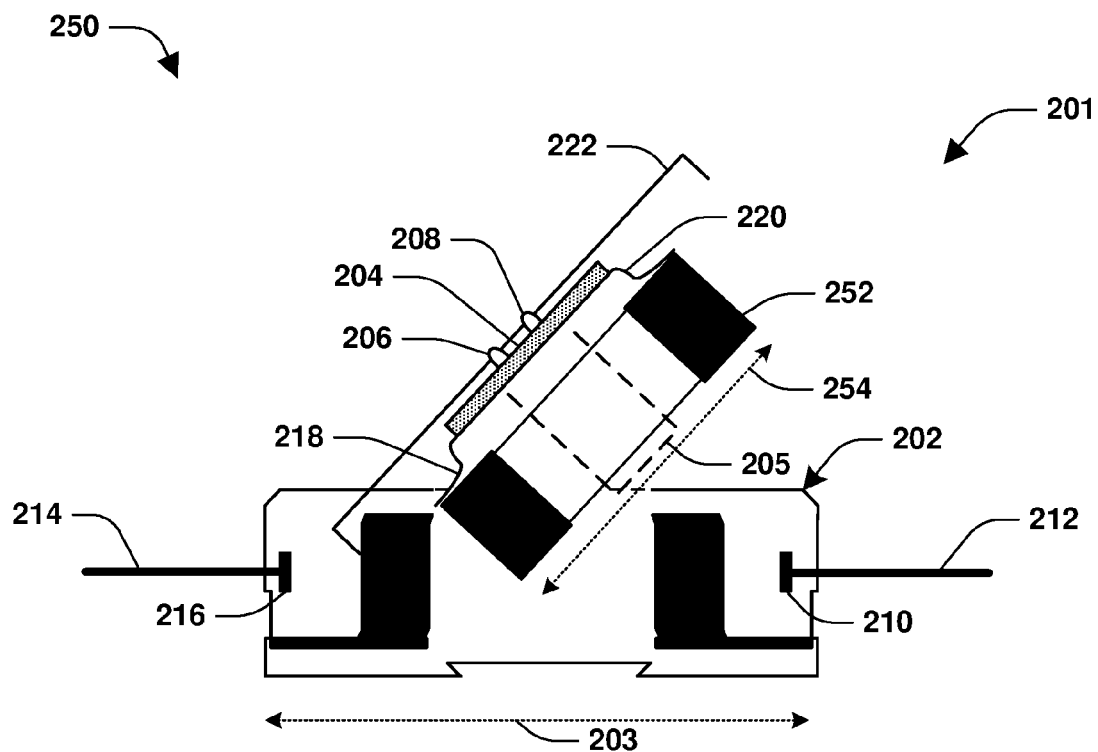
FIG. 2B is a component block diagram illustrating an exemplary system for detecting reverse polarity of a photovoltaic system, where a fuse holder comprises one or more indicator lights.
Figure 2C:
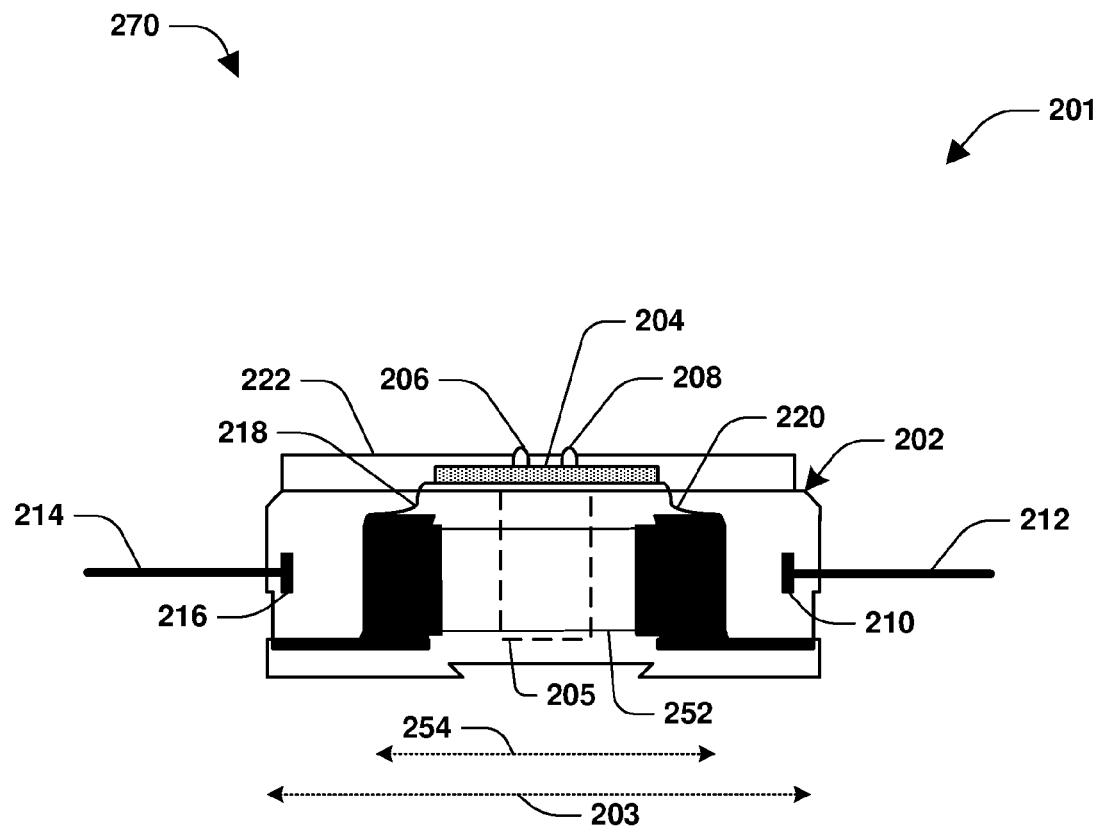
FIG. 2C is a component block diagram illustrating an exemplary system for detecting reverse polarity of a photovoltaic system, where a fuse holder comprises one or more indicator lights.

FIGS. 2A-2C illustrate examples of a fuse holder 201. The fuse holder 201 may comprise a fuse holder body 202 configured to receive and house a fuse (e.g., fuse 252 of FIGS. 2B and 2C). In an example, the fuse holder 201 may be installed along a power line over which a photovoltaic string provides DC power. In another example, the fuse holder may be installed within a fuse holder installation arrangement of a photovoltaic string combiner configured to combine a set of photovoltaic strings of a photovoltaic arrangement in parallel. The fuse holder 201 may comprise a fuse holder body input 216 and a fuse holder body output 210. The fuse holder body input 216 may be configured to connect to an output connection line 214 of the photovoltaic string. The fuse holder body output 210 may be configured to connect to an input connection line 212 for a component to which the photovoltaic string provides DC power, such as an inverter configured to convert DC power to AC power. The fuse holder body 202 may be configured to provide galvanic isolation between the fuse holder body input 216 and the fuse holder body output 210 when the fuse holder body 202 is in an open position and/or when the fuse 252 is not installed in the fuse holder body 202. In an example, the fuse holder body 202 may have a fuse holder body length 203 that is at least 1.5 times (e.g., 2 times, etc.) a fuse length 254 of the fuse 252, as illustrated in FIGS. 2B and 2C, so that the fuse holder body 202 will not experience an issue with having reverse voltage on the fuse holder 201 in the event the photovoltaic string is installed backwards. In another example, the fuse holder body is configured to withstand (e.g., is rated for) about double (e.g., more than double) a rated voltage of the fuse. The fuse holder body 202 may comprise a fuse holder body cover 222 that may open to provide access for insertion of the fuse 252 into a fuse holder arrangement 205 for installation of the fuse 252 within the fuse holder 201.

The fuse holder 201 may comprise a reverse polarity detection component 204 electrically coupled to the fuse holder body input 216 by a first indicator contact plate 218 and electrically coupled to the fuse holder body output 210 by a second indicator contact plate 220 so that the reverse polarity detection component 204 may evaluate a polarity of DC power provided by the photovoltaic string to the fuse holder body input 216. The reverse polarity detection component 204 may be configured to identify the polarity of the photovoltaic string when the fuse 252 is not installed within the fuse holder body 202. Responsive to the polarity being indicative of a reverse polarity, the reverse polarity detection component 204 may provide a reverse polarity indication of the reverse polarity (e.g., an audible alert such as a noise, a visible alert such as a light or a blinking light, a lockout mechanism to prohibit installation of the fuse 252 into the fuse holder 201, a message sent over a network such as a wired or wireless network to a device such as a mobile device or a server, etc.).

The fuse holder 201 may comprise a first indicator light 206 (e.g., a first light emitting diode (LED) having a first color) and a second indicator light 208 (e.g., a second LED having a second color). Responsive to the polarity being indicative of the reverse polarity (e.g., the photovoltaic string is connected backwards), the reverse polarity detection component 204 may be configured to provide the reverse polarity indication through the first indicator light 206 (e.g., the first indicator light 206 may be illuminated or blinked). Responsive to the polarity being indicative of a normal polarity (e.g., the photovoltaic string is not connected backwards), a normal polarity indication may be provided through the second indicator light 208 (e.g., the second indicator light may be illuminated or blinked). It may be appreciated that any number or configuration of visible indicators, such as a single indicator light or a multicolored indicator light, may be used to alert a user of the reverse polarity.

FIG. 2B illustrates an example 250 of the fuse holder body cover 222 being opened into an open position for installation of the fuse 252. The fuse 252 may be inserted into the fuse holder arrangement 205 that is configured to hold the fuse 252 in place for installation. FIG. 2C illustrates an example 270 of the fuse holder body cover 222 being closed into a closed position to complete installation of the fuse 252, such that DC power from the photovoltaic string may flow into the fuse holder body input 216, through the fuse 252, and out through the fuse holder body output 210. In an example, the reverse polarity detection circuit 206 may bypass reverse polarity detection when the fuse holder body cover 222 is in the open position and/or when the fuse 252 is installed within the fuse holder 201. In an example, the fuse holder 201 may be configured to function as a blown fuse indicator when the fuse 252 is installed within the fuse holder 201. The fuse 252 may have a rating, such as a voltage rating, corresponding to an open circuit voltage of the photovoltaic string. In an example, the fuse 252 may be rated less than two times the open circuit voltage of the photovoltaic string.

Figure 3:
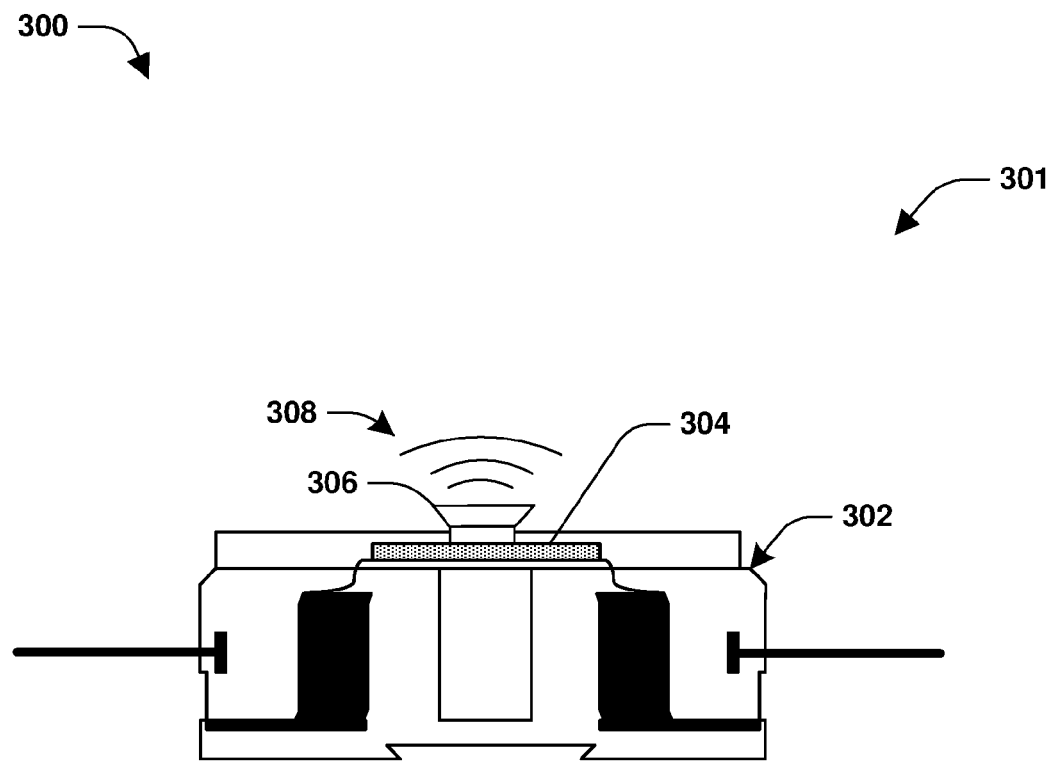
FIG. 3 is a component block diagram illustrating an exemplary system for detecting reverse polarity of a photovoltaic system, where a fuse holder is configured to provide an audible alert.

FIG. 3 illustrates an example 300 of a fuse holder 301. The fuse holder 301 may comprise a fuse holder body 302 configured to receive a fuse. The fuse holder 301 may comprise a reverse polarity detection component 304. The reverse polarity detection component 304 may be configured to identify a polarity of a direct current source, such as a photovoltaic string or other source that provides DC power. Responsive to the polarity being indicative of a reverse polarity, the reverse polarity detection component 304 may provide an audible alert 308 of the reverse polarity. For example, the audible alert 308 may be provided through a speaker 306 of the fuse holder 301. In this way, an installer that is to install a fuse within the fuse holder 301 may be provided with the audible alert 308 before installation of the fuse in the event a reverse polarity event is detected so that the installer may address a cause of the reverse polarity event (e.g., the installer can reinstall the photovoltaic string so that the photovoltaic string is not installed backwards) before installing the fuse and closing the circuit.

Figure 4A:
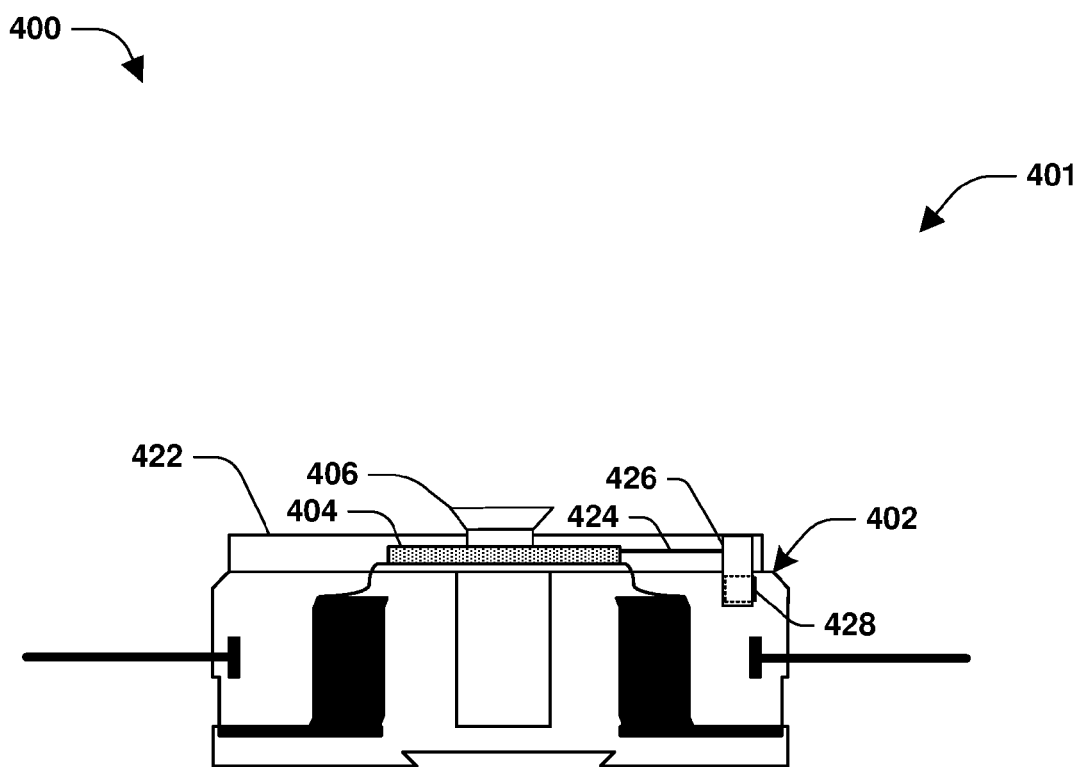
FIG. 4A is a component block diagram illustrating an exemplary system for detecting reverse polarity of a photovoltaic system, where a fuse holder comprises a locking mechanism.
Figure 4B:
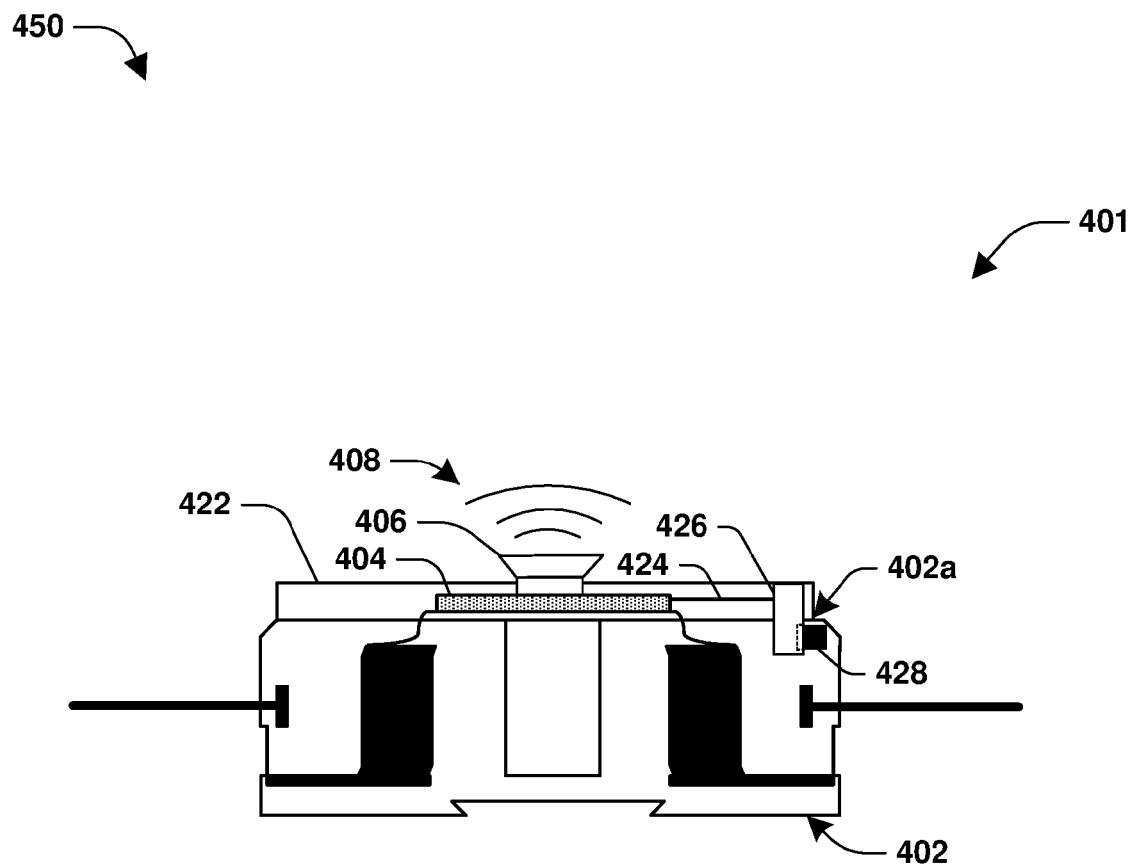
FIG. 4B is a component block diagram illustrating an exemplary system for detecting reverse polarity of a photovoltaic system, where a fuse holder comprises a locking mechanism.

FIGS. 4A and 4B illustrate examples of a fuse holder 401. FIG. 4A illustrates an example 400 of the fuse holder 401 comprising a fuse holder body 402 configured to receive a fuse. The fuse holder 401 may comprise a reverse polarity detection component 404 configured to provide an audible alert 408 through a speaker 406 responsive to identifying a reverse polarity of a photovoltaic string or other direct current source. The fuse holder body 402 may comprise a fuse holder body cover 422 that may be opened in order to provide access into the fuse holder body 402 for installation of the fuse. The fuse holder body 402 may comprise a locking mechanism 426, such as a solenoid, connected to the reverse polarity detection component 404 by an electrical connection 424. In an example, the locking mechanism 426 may be attached to the fuse holder body cover 422. The locking mechanism 426 may house a lock 428 configured to retract into the locking mechanism 426 when the reverse polarity detection component 404 determines that a polarity of the photovoltaic string is normal, and thus the fuse holder body cover 422 may be opened so that a fuse may be installed into the fuse holder 401. When the reverse polarity detection component 404 determines that the polarity of the photovoltaic string is reversed, the lock 428 may be configured to extend out from the locking mechanism 426 so that the fuse holder body cover 422 is unable to be opened. It may be appreciated that any configuration, size, position, mechanism type, and/or lock type is contemplated for the locking mechanism 426 and lock 428 (e.g., the locking mechanism 426 may be positioned at any location inside or outside the fuse holder 401).

FIG. 4B illustrates the example 450 of the reverse polarity detection component 404 invoking the locking mechanism 426 to lock the fuse holder body 402 to prohibit installation of the fuse based upon the photovoltaic string having the reverse polarity. For example, the reverse polarity detection component 404 may send a signal over the electrical connection 424 to the locking mechanism 426. The signal may invoke the locking mechanism 426 to extend the lock 428, such as by applying a force to push the lock 428, so that the lock 428 prohibits a user from opening the fuse holder body cover 422. For example, the lock 428 may encounter (e.g., contact, engage, abut against, etc.) a portion 402a of the fuse holder body 402 to limit movement of the lock 428 and the fuse holder body cover 422 so that a user is unable to open the fuse holder body cover 422 for installation of the fuse while the reverse polarity is detected. In an example, the reverse polarity detection component 404 may provide the audible alert 408 through the speaker 406 based upon the reverse polarity.

Figure 5A:
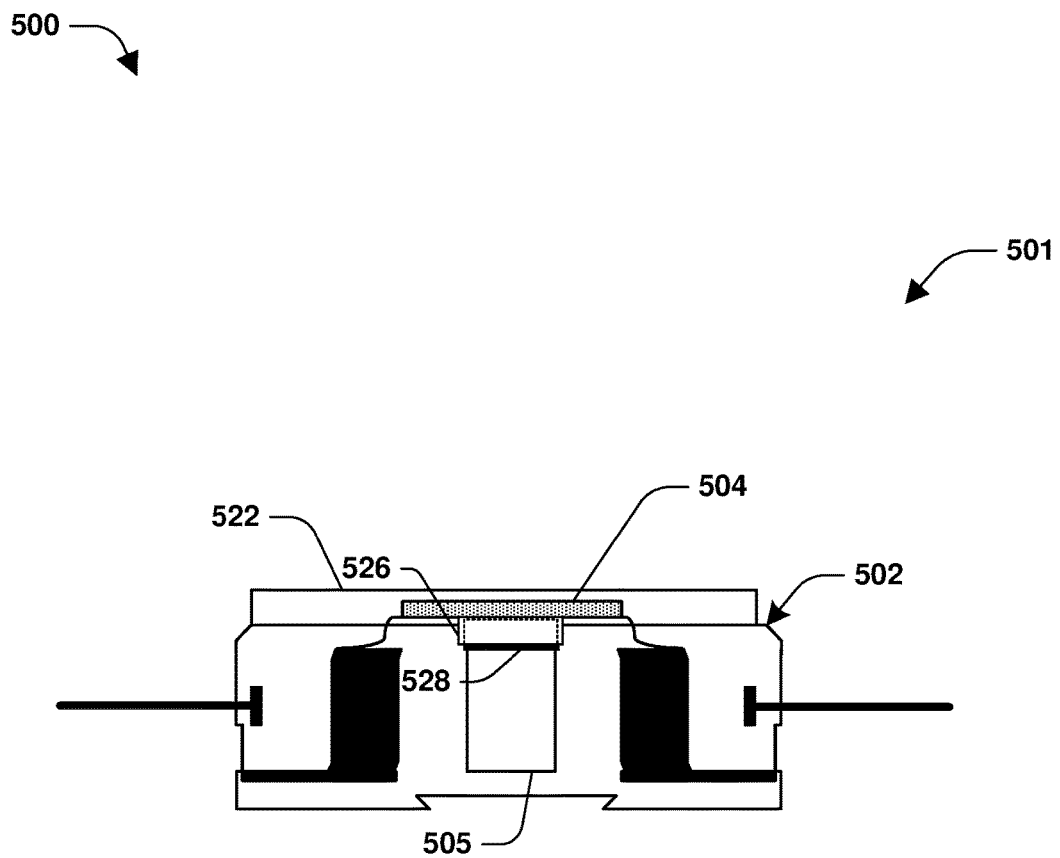
FIG. 5A is a component block diagram illustrating an exemplary system for detecting reverse polarity of a photovoltaic system, where a fuse holder comprises a locking mechanism.
Figure 5B:
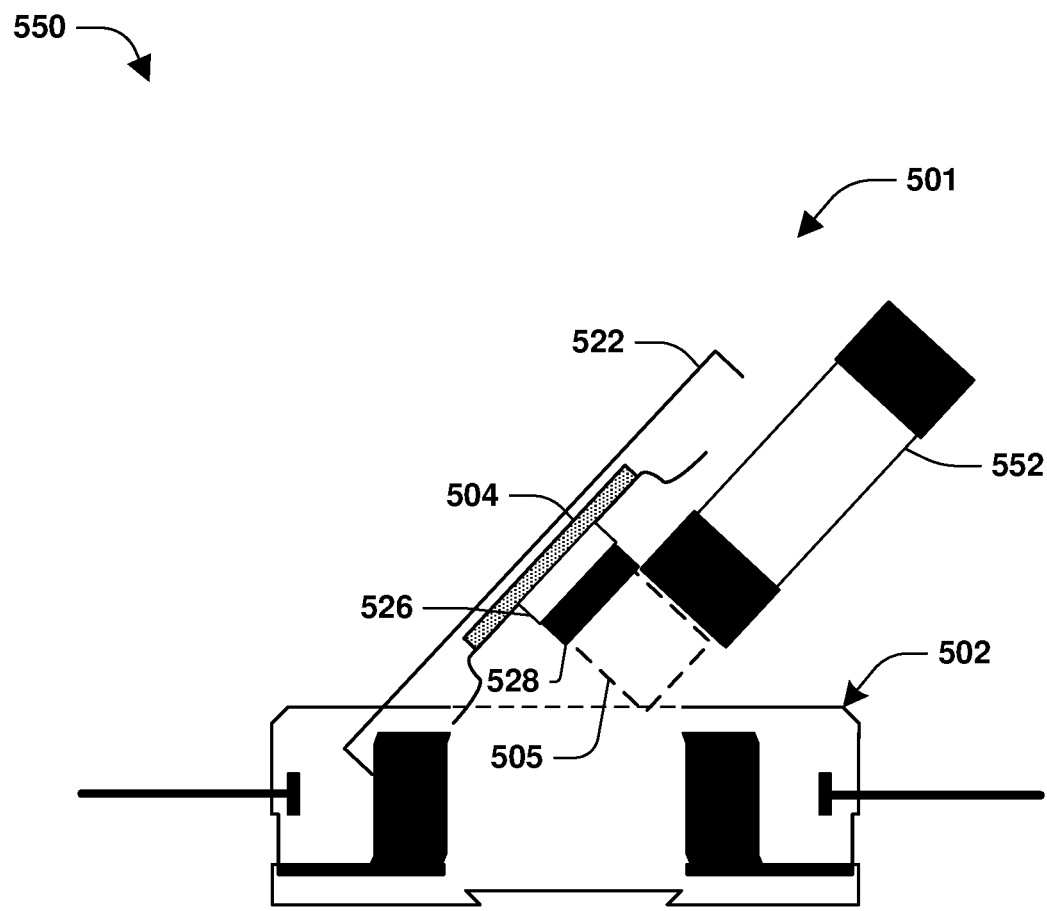
FIG. 5B is a component block diagram illustrating an exemplary system for detecting reverse polarity of a photovoltaic system, where a fuse holder comprises a locking mechanism.

FIGS. 5A and 5B illustrate examples of a fuse holder 501. FIG. 5A illustrates an example 500 of the fuse holder 501 comprising a fuse holder body 502 configured to receive a fuse. The fuse holder 501 may comprise a reverse polarity detection component 504 configured to evaluate a polarity of a photovoltaic string or other direct current source. The fuse holder body 502 may comprise a fuse holder body cover 522 that may be opened in order to provide access into the fuse holder body 502 for installation of the fuse. The fuse holder body 502 may comprise a locking mechanism 526, such as a solenoid, connected to the reverse polarity detection component 504. In an example, the locking mechanism 526 may be attached to the fuse holder body cover 522. The locking mechanism 526 may house a lock 528 configured to retract into the locking mechanism 526 when the reverse polarity detection component 504 determines that a polarity of the photovoltaic string is normal. When the reverse polarity detection component 504 determines that the polarity of the photovoltaic string is reversed, the lock 528 may be configured to extend out from the locking mechanism 526 to block insertion of the fuse into a fuse holder arrangement 505 for installation of the fuse. It may be appreciated that any configuration, size, position, mechanism type, and/or lock type is contemplated for the locking mechanism 526 and lock 528 (e.g., the locking mechanism 526 may be positioned at any location inside or outside the fuse holder 501).

FIG. 5B illustrates an example 550 of the reverse polarity detection component 504 invoking the locking mechanism 526 to extend the lock 528 through the fuse holder arrangement in order to block installation of a fuse 552 based upon the photovoltaic string having the reverse polarity. For example, the lock 528 may protrude out from the locking mechanism 526 into the fuse holder arrangement 505. While the lock 528 is protruding into the fuse holder arrangement 505, the fuse 552 may be blocked from being inserted into the fuse holder arrangement 505 for installation into the fuse holder 501.

Figure 6:
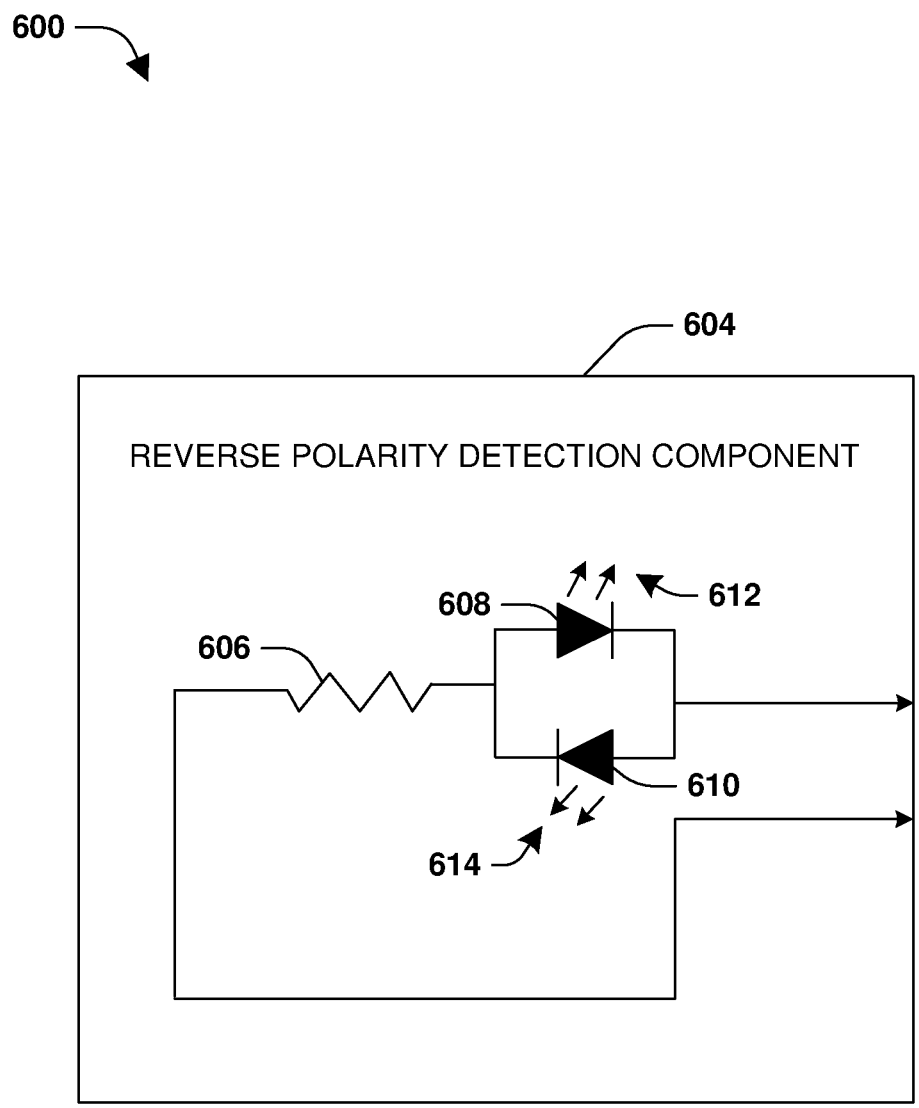
FIG. 6 is a component block diagram illustrating an exemplary system comprising a reverse polarity detection component.

FIG. 6 illustrates an example of a system 600 for detecting reverse polarity of a photovoltaic system and/or a direct current system. The system 600 may comprise a reverse polarity detection component 604. The reverse polarity detection component 604 may comprise a resistor 606, a first diode 608, a second diode 610, and/or any other components used to identify polarity of a direct current source. The reverse polarity detection component 604 may be coupled to a direct current source, such as a photovoltaic string of photovoltaic panels. The reverse polarity detection component 604 may be configured to identify a polarity of DC power provided by the direct current source. The first diode 608 and the second diode 610 may be associated with one or more indicator lights, such as a bicolor light emitting diode (LED). Responsive to the polarity being a normal polarity, the second diode 610 may illuminate 614 the bicolor LED a first color to indicate that the direct current source has the normal polarity (e.g., that the direct current source is not installed backwards). Responsive to the polarity being a reverse polarity, the first diode 608 may illuminate 612 the bicolor LED a second color to indicate that the direct current source has the reverse polarity (e.g., that the direct current source is installed backwards).

Figure 7:
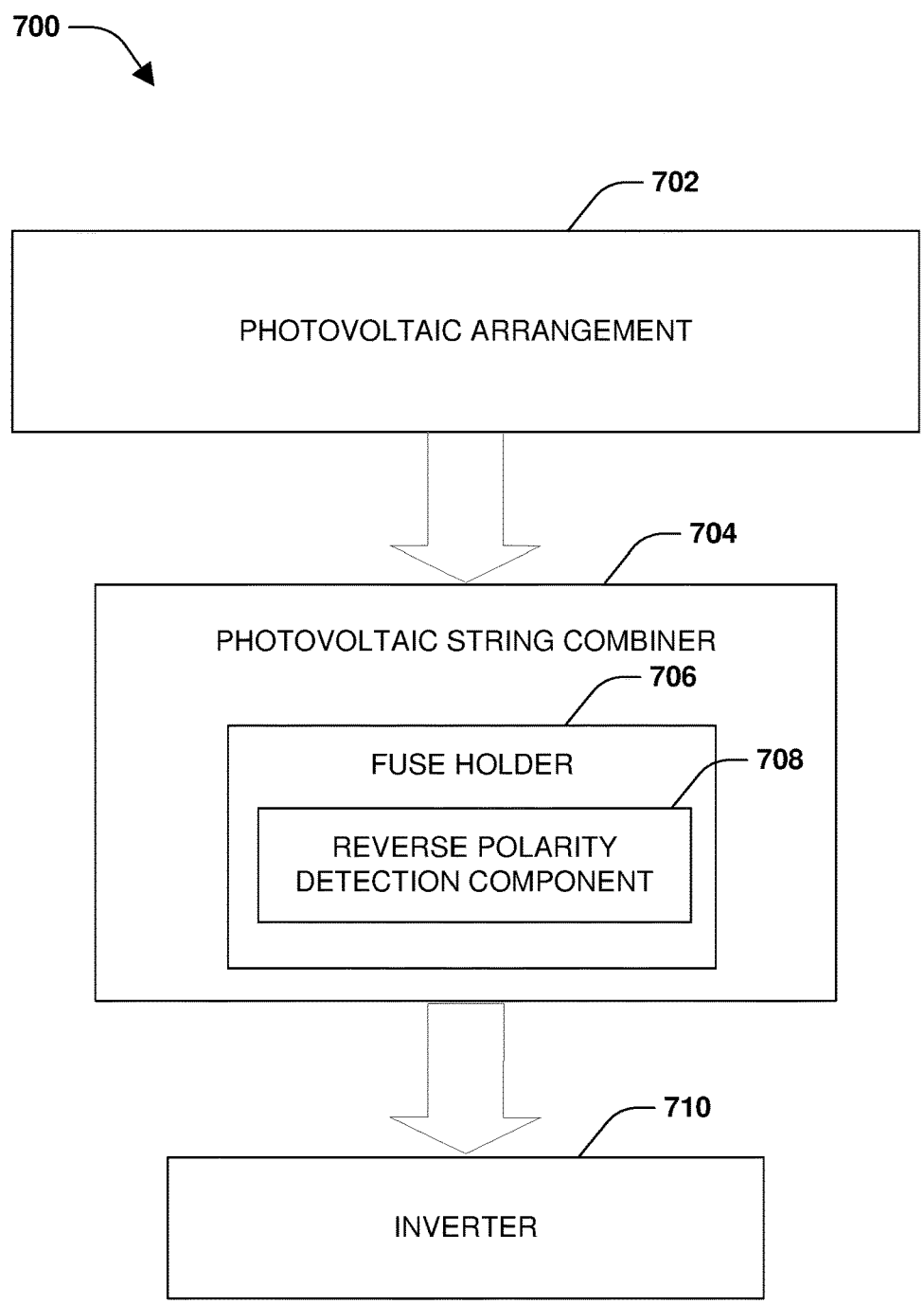
FIG. 7 is a component block diagram illustrating an exemplary system comprising a fuse holder installed within a photovoltaic string combiner.

FIG. 7 illustrates an example of a system 700 for detecting reverse polarity of a photovoltaic arrangement 702. A photovoltaic string combiner 704 may be configured to combine one or more photovoltaic strings (e.g., a string of photovoltaic panels connected in series) in parallel. The photovoltaic string combiner 704 may comprise a fuse holder installation arrangement configured to receive a fuse holder 706 for installation. The fuse holder 706 may comprise a fuse holder body configured to receive a fuse used to protect against damage from excessive current occurring from the photovoltaic arrangement 702, such as due to a short circuit. The fuse holder 706 may have a fuse holder body input connected to a photovoltaic string of the photovoltaic arrangement 702 so that DC power from the photovoltaic arrangement 702 is received through the fuse holder body input and is directed through the fuse. The fuse holder 706 may have a fuse holder body output that connects to an inverter 710. After the DC power passes through the fuse, the DC power may be output through the fuse holder body output to the inverter 710. The inverter 710 may be configured to convert the DC power to AC power, such as for an AC power grid (e.g., to power a building). The fuse holder 706 may comprise a reverse polarity detection component 708 configured to evaluate the DC power to determine a polarity of the photovoltaic string. Responsive to the polarity being indicative of a reverse polarity condition, the reverse polarity detection component 708 may provide a reverse polarity indication, such as blinking a light, providing an audible alert, sending a message across a network (e.g., a message sent over a wireless connection to a mobile device such as a smart phone of a user; a message sent over a network to which the photovoltaic string combiner 704 is connected; etc.), etc. In an example, the photovoltaic string combiner 704 and the inverter 710 may be integrated into the same device, such as a single residential inverter product.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

It will be appreciated that layers, features, elements, etc. depicted herein are illustrated with particular dimensions relative to one another, such as structural dimensions or orientations, for example, for purposes of simplicity and ease of understanding and that actual dimensions of the same differ substantially from that illustrated herein, in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system for detecting reverse polarity of a photovoltaic system, comprising:
   a fuse holder comprising:
      a fuse holder body configured to receive a fuse;
      a reverse polarity detection component configured to identify a polarity of a photovoltaic string of a photovoltaic arrangement and, responsive to the polarity being indicative of a reverse polarity, to provide a reverse polarity indication of the reverse polarity; and
      a locking mechanism for locking the fuse holder body to prohibit installation of the fuse responsive to the polarity being indicative of the reverse polarity.

2. The system of claim 1, the locking mechanism comprising a solenoid.

3. The system of claim 1, the fuse holder comprising a first indicator light and a second indicator light, and the reverse polarity detection component configured to:
   responsive to the polarity being indicative of the reverse polarity, provide the reverse polarity indication through the first indicator light; and
   responsive to the polarity being indicative of a normal polarity, provide a normal polarity indication through the second indicator light.

4. The system of claim 1, the reverse polarity detection component configured to provide the reverse polarity indication as an audible alert.

5. The system of claim 1, the fuse holder body configured to withstand double a rated voltage of the fuse.

6. The system of claim 1, the fuse holder body configured to provide galvanic isolation between a fuse holder body input and a fuse holder body output of the fuse holder body when the fuse holder body is in an open position.

7. The system of claim 1, the reverse polarity detection component configured to detect reverse polarity when the fuse is not installed within the fuse holder body.

8. The system of claim 1, the reverse polarity detection component configured to bypass reverse polarity detection when the fuse is installed within the fuse holder body.

9. The system of claim 1, the fuse having a rating corresponding to an open circuit voltage of the photovoltaic arrangement.

10. The system of claim 1, comprising:
    a photovoltaic string combiner configured to combine a set of photovoltaic strings of the photovoltaic arrangement, the photovoltaic string combiner comprising:
       a fuse holder installation arrangement configured to receive the fuse holder for installation.

11. The system of claim 10, the photovoltaic string combiner comprising a DC power output connection to an inverter, the inverter configured to convert DC power, provided by the photovoltaic arrangement through the photovoltaic string combiner, to AC power.

12. The system of claim 1, the fuse holder configured to function as a blown fuse indicator for the photovoltaic string when the fuse is installed within the fuse holder.

13. A system for detecting reverse polarity of a photovoltaic system, comprising:
    a reverse polarity detection component configured to:
       identify a polarity of a photovoltaic string of a photovoltaic arrangement, the photovoltaic string configured to connect to a fuse holder comprising a fuse holder body configured to receive a fuse for the photovoltaic string;
       responsive to the polarity being indicative of a reverse polarity, provide a reverse polarity indication of the reverse polarity; and
       invoke a locking mechanism to lock the fuse holder body to prohibit installation of the fuse responsive to the photovoltaic string being indicative of the reverse polarity.

14. The system of claim 13, the reverse polarity detection component comprising a first indicator light and a second indicator light, the reverse polarity detection component configured to:
    responsive to the polarity being indicative of the reverse polarity, provide the reverse polarity indication through the first indicator light; and
    responsive to the polarity being indicative of a normal polarity, provide a normal polarity indication through the second indicator light.

15. The system of claim 13, the reverse polarity detection component configured to provide the reverse polarity indication as an audible alert.

16. A system for detecting reverse polarity of a direct current system, comprising:
    a fuse holder comprising:
       a fuse holder body configured to receive a fuse;
       a reverse polarity detection component configured to identify a polarity of a direct current source and, responsive to the polarity being indicative of a reverse polarity, to provide a reverse polarity indication of the reverse polarity; and
       a locking mechanism configured to lock the fuse holder body to prohibit installation of the fuse responsive to the polarity being indicative of the reverse polarity.

17. The system of claim 16, the direct current source comprising one or more photovoltaic panels.

18. The system of claim 16, wherein the fuse holder further comprises a light element for providing the reverse polarity indication as visible illumination.

19. The system of claim 16, wherein the fuse holder further comprises a speaker for providing the reverse polarity indication as an audible alert.

* * * * *